(No Model.) 7 Sheets—Sheet 1.

W. KLOSTERMANN.
MIDDLINGS PURIFIER.

No. 405,487. Patented June 18, 1889.

WITNESSES:
W. R. Davis.
C. Sedgwick.

INVENTOR:
W. Klostermann
BY Munn & Co.
ATTORNEYS.

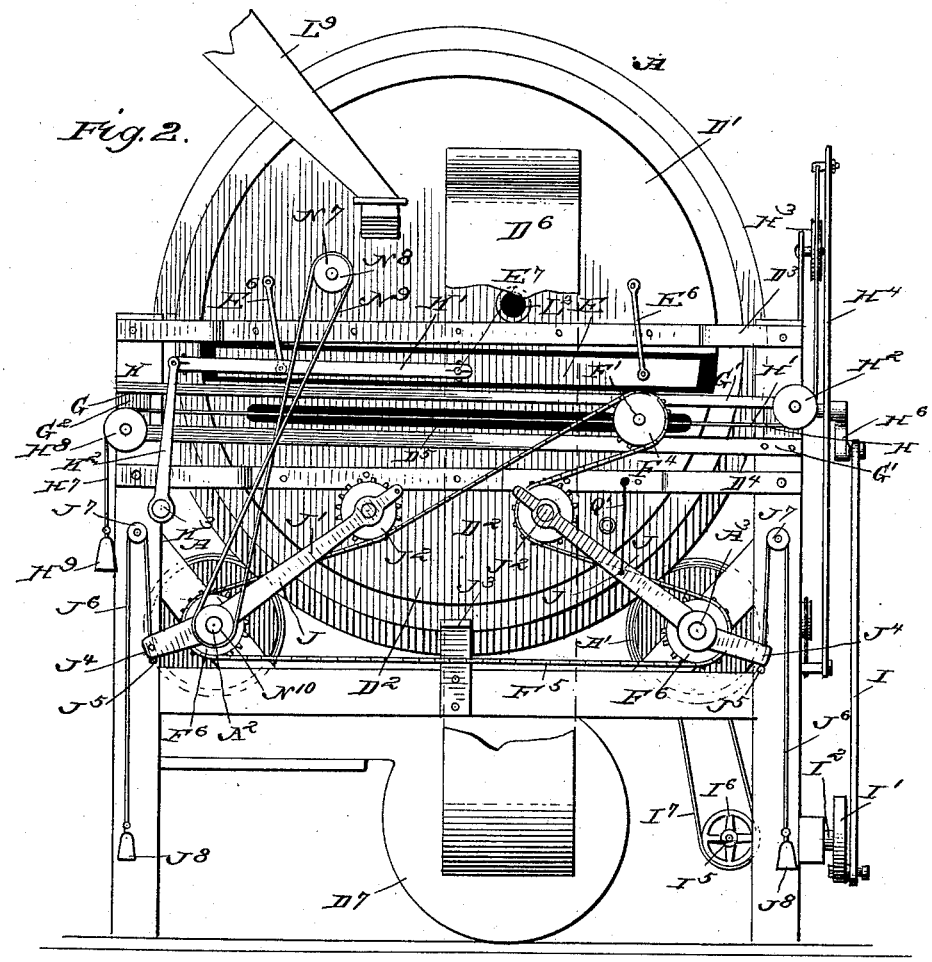

(No Model.) 7 Sheets—Sheet 3.

W. KLOSTERMANN.
MIDDLINGS PURIFIER.

No. 405,487. Patented June 18, 1889.

WITNESSES: W. R. Davis, C. Sedgwick

INVENTOR: W. Klostermann
BY Munn & Co.
ATTORNEYS.

(No Model.)  7 Sheets—Sheet 4.
W. KLOSTERMANN.
MIDDLINGS PURIFIER.
No. 405,487.  Patented June 18, 1889.
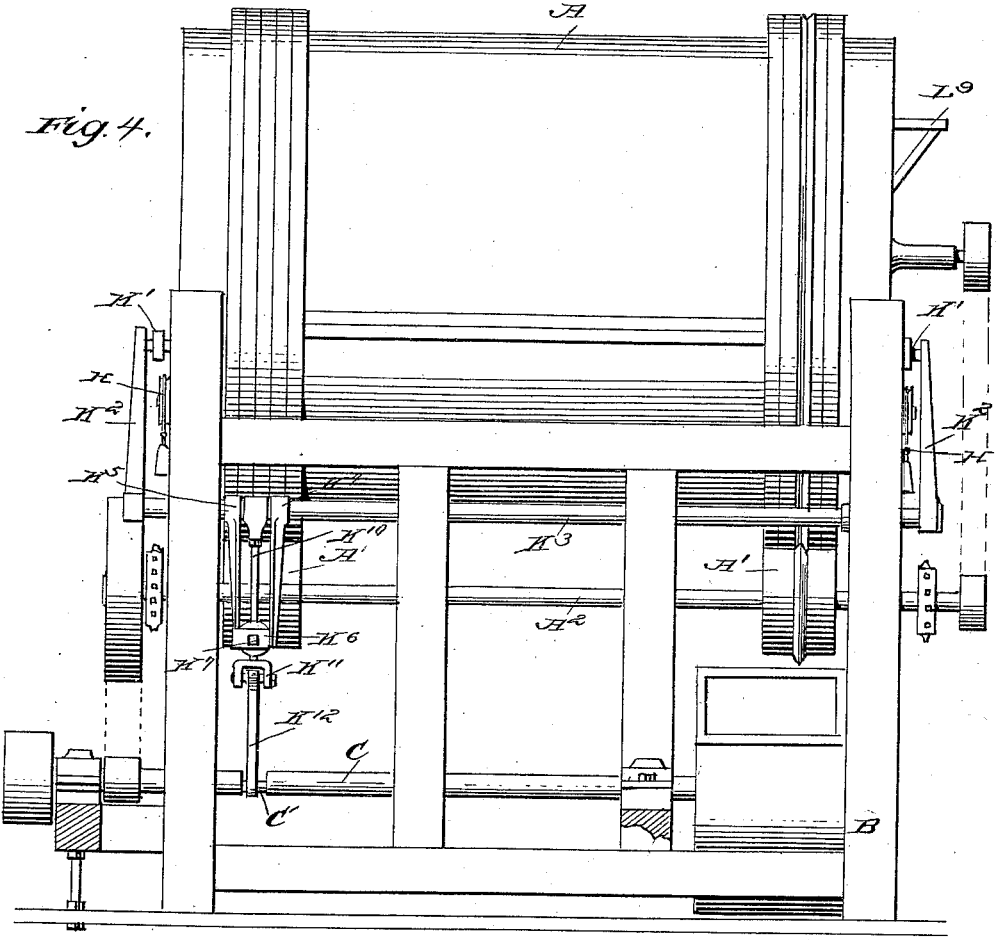
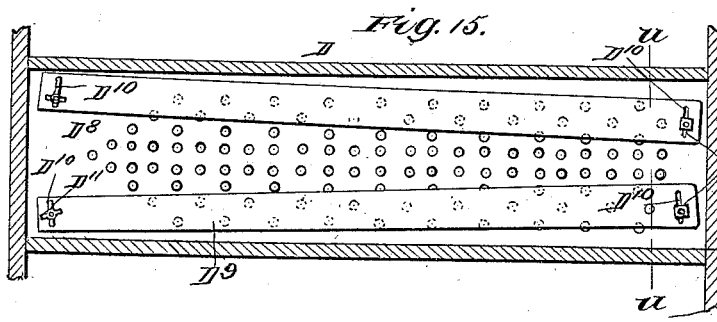
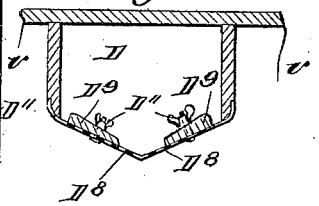
WITNESSES:
W. R. Davis
C. Sedgwick
INVENTOR:
W. Klostermann
BY
Munn & Co.
ATTORNEYS.

(No Model.) 7 Sheets—Sheet 5.
W. KLOSTERMANN.
MIDDLINGS PURIFIER.
No. 405,487. Patented June 18, 1889.
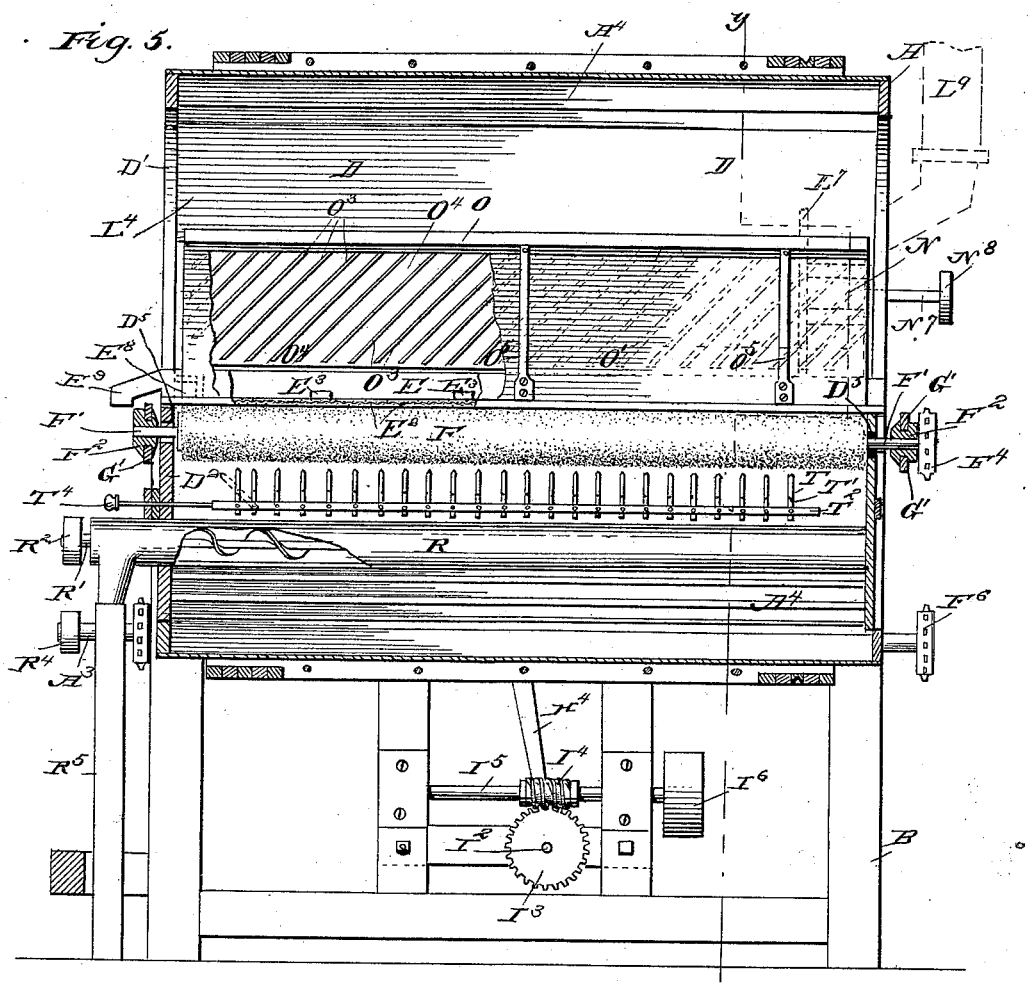
WITNESSES:
W. R. Davis
C. Sedgwick
INVENTOR:
W. Klostermann
BY
Munn & Co.
ATTORNEYS.

(No Model.) 7 Sheets—Sheet 6.

W. KLOSTERMANN.
MIDDLINGS PURIFIER.

No. 405,487. Patented June 18, 1889.

WITNESSES:
W. R. Davis
C. Sedgwick

INVENTOR:
W. Klosterman
Munn & Co.
ATTORNEYS.

(No Model.)  7 Sheets—Sheet 7.

W. KLOSTERMANN.
MIDDLINGS PURIFIER.

No. 405,487.  Patented June 18, 1889.

WITNESSES:
W. R. Davis
E. Mc. Clark

INVENTOR
William Klostermann
BY
Munn & Co
ATTORNEY

UNITED STATES PATENT OFFICE.

WILLIAM KLOSTERMANN, OF YOUNG AMERICA, MINNESOTA.

MIDDLINGS-PURIFIER.

SPECIFICATION forming part of Letters Patent No. 405,487, dated June 18, 1889.

Application filed November 13, 1888. Serial No. 290,659. (No model.)

*To all whom it may concern:*

Be it known that I, WILLIAM KLOSTERMANN, of Young America, in the county of Carver and State of Minnesota, have invented a new and Improved Middlings-Purifier, of which the following is a full, clear, and exact description.

The invention relates to middlings-purifiers such as shown and described in the application for Letters Patent filed by me June 26, 1888, Serial No. 278,299.

The object of the present invention is to provide a new and improved middlings-purifier, which is simple and durable in construction, very effective in operation, and specially intended for fine middlings.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
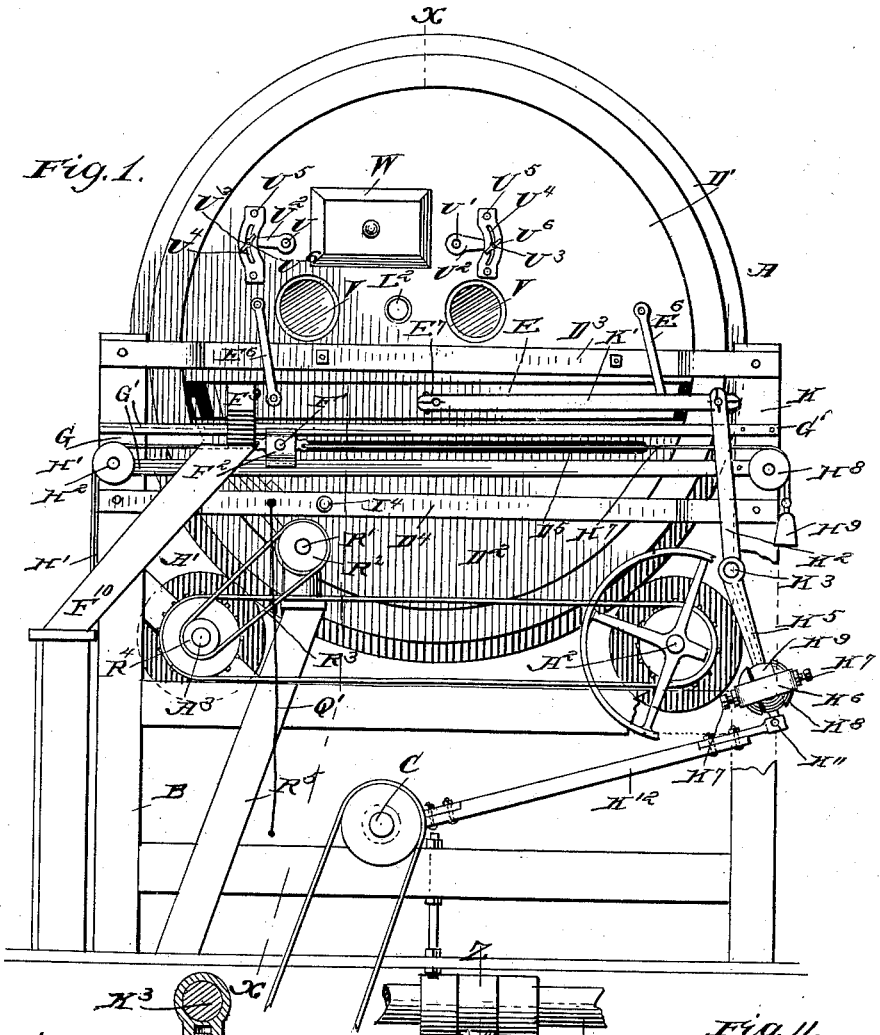
Figure 10:
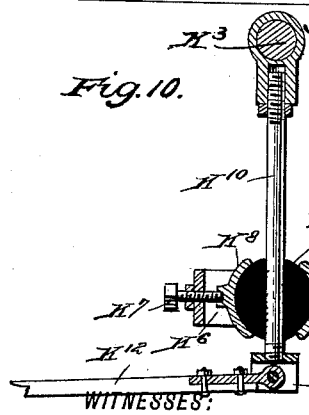
Figure 9:
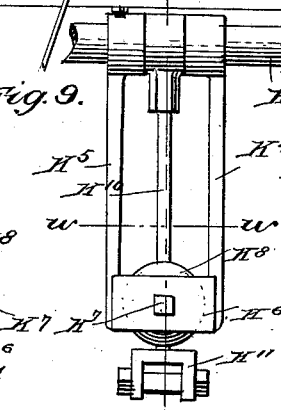
Figure 11:
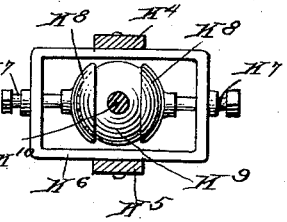
Figure 3:
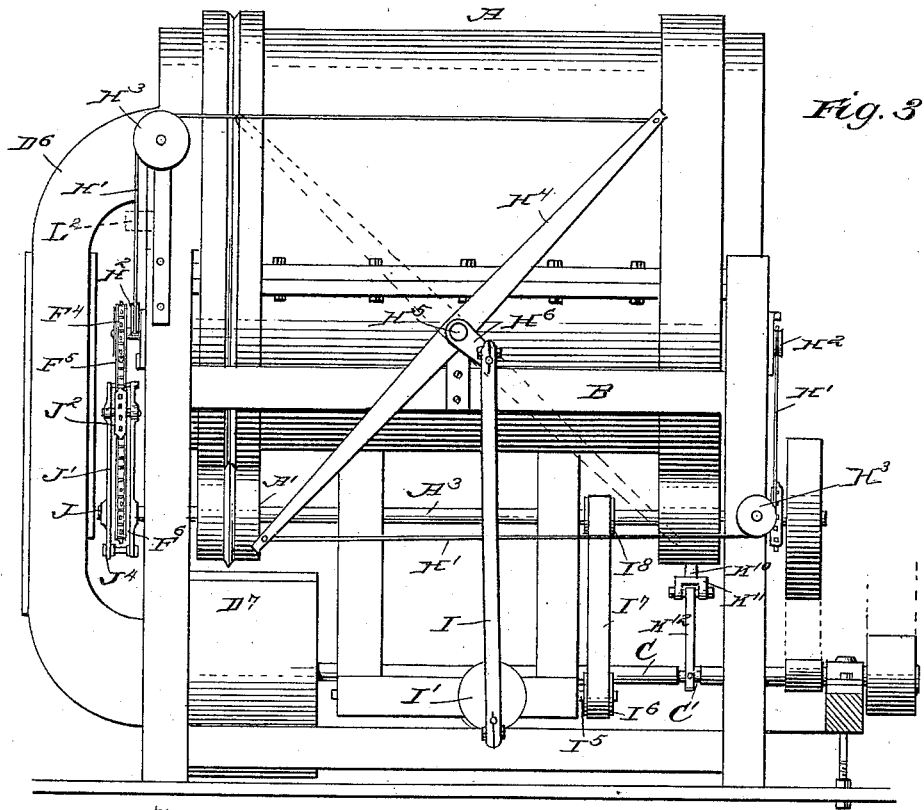
Figure 7:
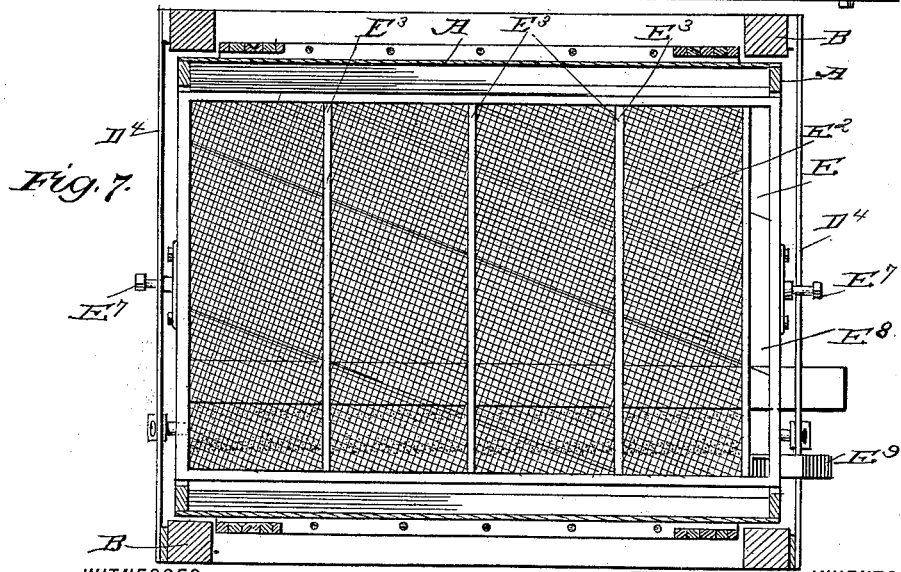
Figure 8:
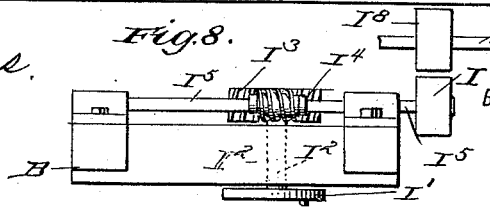
Figure 6:
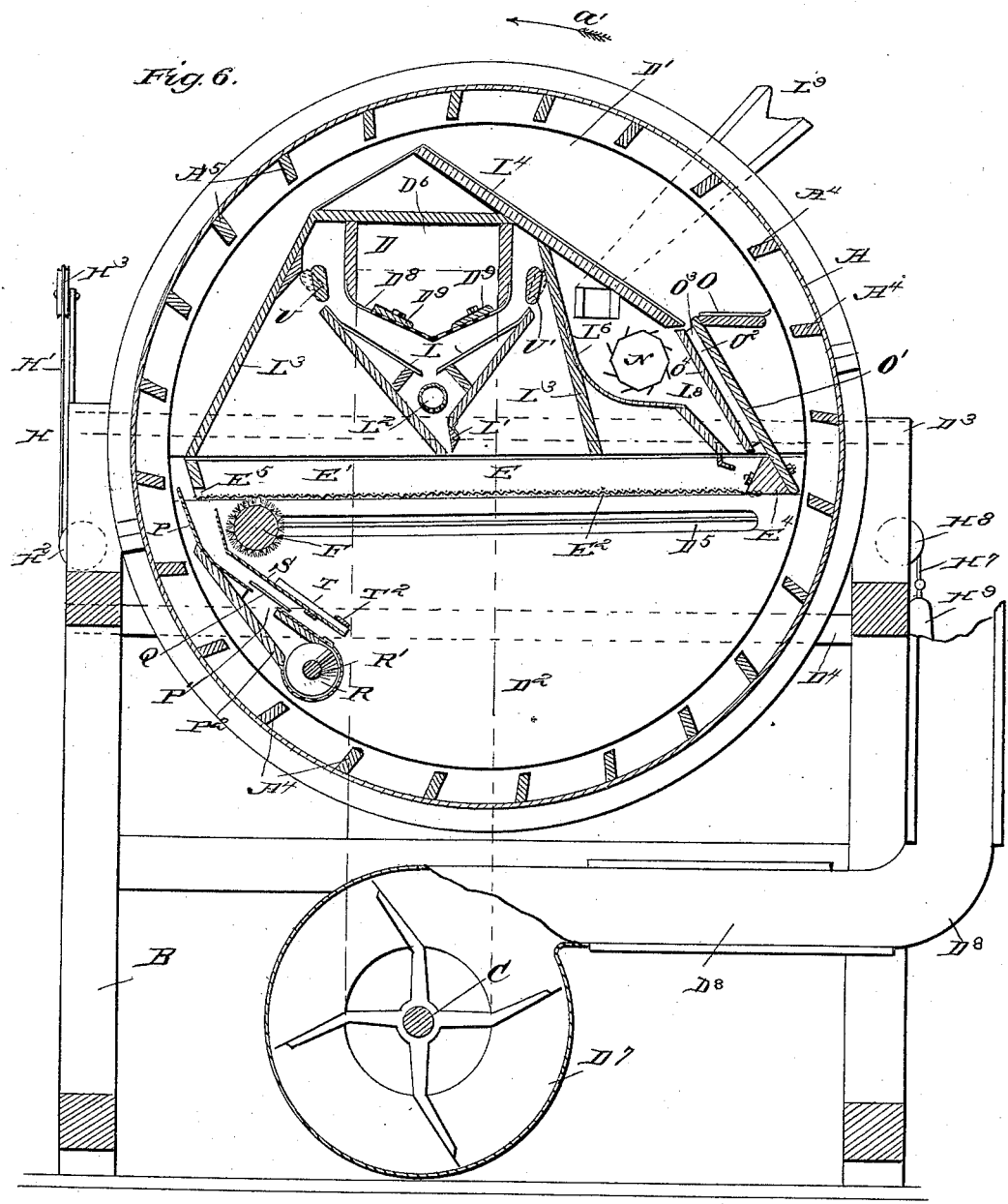
Figure 19:
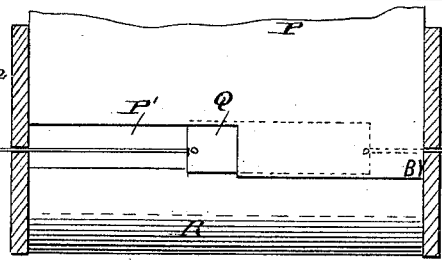
Figure 20:
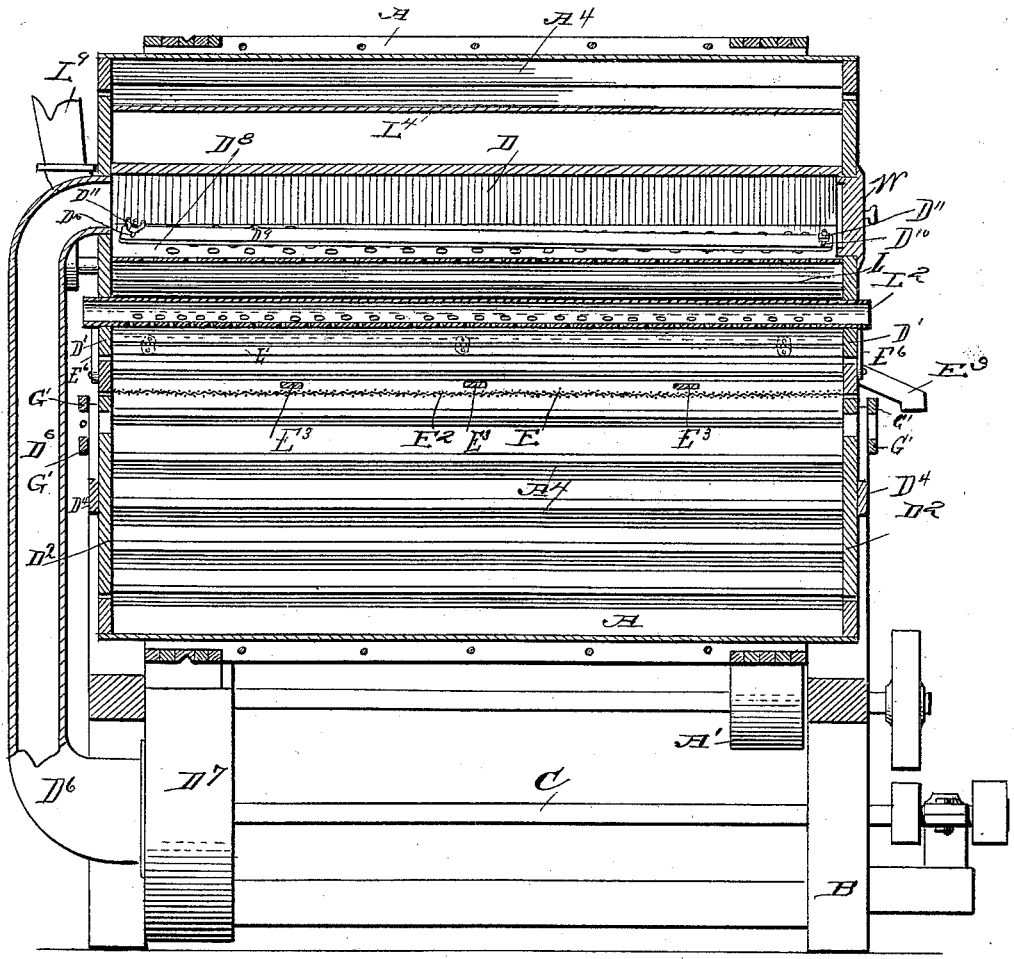

Figure 1 is a front end elevation of the improvement. Fig. 2 is a rear end elevation of the same with parts broken out. Fig. 3 is a rear side elevation of the same. Fig. 4 is an enlarged front side elevation of the same. Fig. 5 is a longitudinal sectional elevation of the same on the line $x\ x$ of Fig. 1. Fig. 6 is an enlarged transverse section of the same on the line $y\ y$ of Fig. 5. Fig. 7 is a sectional plan view of the frame, drum, and vibrating box-screen. Fig. 8 is an enlarged plan view of the device for imparting motion to the mechanism for sliding the screen-brush. Fig. 9 is an enlarged side elevation of the screen-shaking device. Fig. 10 is a sectional end elevation of the same on the line $z\ z$ of Fig. 9. Fig. 11 is a sectional plan view of the same on the line $w\ w$ of Fig. 9. Fig. 12 is an end elevation of the screen-brush bearing and box. Fig. 13 is a sectional side elevation of the fastening for the screen-brush bearing. Fig. 14 is a sectional side elevation of the same. Fig. 15 is an enlarged sectional plan view of the suction-box on the line $v\ v$ of Fig. 16. Fig. 16 is a sectional end elevation of the same on the line $u\ u$ of Fig. 15. Fig. 17 is a plan view of the middlings feed-wheel with the bearing in section, and Fig. 18 is a sectional end elevation of the same on the line $t\ t$ of Fig. 17. Fig. 19 is a plan view, partly in section, of the slide over the conveyer. Fig. 20 is a longitudinal vertical section on the irregular dotted line $w\ w$, Fig. 6.

The improved middlings-purifier is provided with a cylindrical revolving drum A, supported on the friction-wheels A', secured to the shafts $A^2$ and $A^3$ in the same manner as described in the application above referred to. The shafts $A^2$ and $A^3$ are mounted to rotate in suitable bearings in the main frame B, and derive their motion from the main driving-shaft C, also mounted to rotate in suitable bearings on the main frame A, and connected with suitable machinery for imparting a rotary motion to the said main shaft C.

The revolving drum A is provided in its interior with the longitudinal elevating-strips $A^4$, all arranged at the same angle in relation to the drum A. The latter is open at both ends, and is closed by heads each formed of two sections D' and $D^2$, supported on transverse strips $D^3$ and $D^4$, respectively secured by each end to the main frame B on the outside of the drum A. The sections D' in the two ends of the drum A support a longitudinal suction-box D, connected at one end with the channel $D^6$, leading to the suction-fan $D^7$, of any approved construction, and operated from the main driving-shaft C. Between the head-sections D' and $D^2$ is held the vibrating box-screen E, consisting of a box E', covered on its bottom by a screen $E^2$ and provided with transverse strips $E^3$, and on one side is formed a bottom flange $E^4$, while on the opposite side is formed an outlet $E^5$ directly above the screen $E^2$, as is plainly shown in Fig. 6. At one end of the box-screen E is formed a small compartment $E^8$, leading in its bottom to a discharge-spout $E^9$, through which the middlings pass to the outside.

Against the under side of the screen $E^2$ is held a brush F, mounted to rotate and to slide forward and backward on the said screen $E^2$, so as to clean the latter and agitate the middlings held on top of the said screen. The brush F is mounted on a shaft F', turning at each end in bearings $F^2$ and passing through a slot $D^5$, formed in each of the sections $D^2$ of the heads. Each of the bearings F² is provided at the top and bottom, on the outside of the sections D², with grooves F³, into which fit the transverse strips G' G' of the frame G, held vertically adjustable on the end posts of the main frame B. Each of the frames G is composed of two parallel strips G', connected with each other at their ends by a cross-piece G², and in the said cross-piece G² screws a bolt G³, passing through a longitudinal slot B' in each of the respective end posts of the frame B. The head of the bolt G³ rests against the shoulder G⁴ on the inside of the said post, and the said bolt serves to move the frame G up and down on the said frame B, so that the brush F is moved more or less in contact with the under side of the screen E². This vertical adjustment of the frame G is specially shown in Fig. 13, and in Fig. 14 a detail view of the bearing F² is represented.

On each end of the bearings F², carrying the brush F, is formed an eye H, one of which is connected with a rope H', of a device for moving the said bearings F² transversely in the frame G, so that the roller F is similarly moved under the screen E². The rope H', Fig. 2, passes under a pulley H², held on the main frame B, and then the rope passes upward over a second pulley H³, and then extends horizontally, being connected to the upper end of a lever H⁴, as is plainly shown in Fig. 3. The lever H⁴ is fulcrumed at H⁵, and is connected at its other lower end with a second rope H', also passing over other pulleys H³ and H² and connected with the bearing F² at the other end of the brush F. On the shaft H⁵, on which the said lever H⁴ is secured, is fastened a crank-arm H⁶, pivotally connected by the link I with the crank-disk I', secured on the end of a shaft I², mounted to turn in suitable bearings on the main frame B. On the inner end of the said shaft I² is held a worm-wheel I³, meshing into a worm I⁴, secured on a shaft I⁵, mounted to rotate longitudinally in suitable bearings in the main frame B. On the outer end of the shaft I⁵ is secured a pulley I⁶, connected by a belt I⁷ with a similar pulley I⁸ on the shaft A³, before mentioned, and receiving its rotary motion from the main driving-shaft C. The other eye of each bearing F² is connected with one end of a rope H⁷, extending in an opposite direction to the rope H' and passing over a pulley H⁸, mounted on the main frame B. The rope H⁷ then extends downward and carries on its lower end a weight H⁹, which serves for moving the brush F backward under the screen E². Thus when the main shaft C is rotated and the rotary motion is imparted to the shafts A² and A³ and the drum A, then the said shaft A³ imparts a like rotary motion to the shaft I⁵, which, by its worm I⁴, meshing into the worm-wheel I³, causes the shaft I² to turn the latter, which, by its crank-disk I', imparts an up-and-down motion to the link I, connected with the crank-arm H⁶, causing the lever H⁴ to swing from the position shown in full lines in Fig. 3 to the position shown in dotted lines in the same figure, so that the weights H⁹ on the ropes H⁷ cause a rearward-sliding motion of the bearings F², carrying the brush F, whereby said brush is moved rearward under the screen E². When the lever H swings from the dotted position to the position shown in full lines in Fig. 3, it exerts a pull on the rope H', whereby the bearings F² are caused to slide forward in their guide-frames G, so that the brush F is moved forward under the screen E².

At one end of the shaft F' of the screen-brush F is secured a sprocket-wheel F⁴, over which passes the endless sprocket-chain F⁵, also passing over sprocket-wheels F⁶, fastened on the transverse shafts A² and A³. In order to take up the slack of the endless sprocket-chain F⁵, I provide two belt-tighteners J, each consisting of an arm J', loosely fulcrumed on the shaft A² or A³, respectively, and carrying at one end a sprocket-wheel J², over which passes the endless sprocket-chain F⁵, as plainly shown in Fig. 2. The downward-swinging motion of the levers J' is limited by a stop J³, secured in the frame B near the middle of one end, and the upward movement of each lever J' is limited by the end J⁴ of the said lever striking against the pin J⁵, secured on the main frame B. The stops J³ and J⁵ of the belt-tighteners J prevent the levers J' from swinging too far up or down, at the same time avoiding entangling of the two belt-tighteners in their up-and-down swinging motion according to the forward or rearward sliding motion of the brush F. The belt-tighteners J are each counterbalanced by connecting a rope J⁶ with the end J⁴ of each lever J', said rope passing upward over a pulley J⁷, held on the frame B, and then extending downward, carrying a weight J⁸. The slack of the endless sprocket-chain F⁵ is thus taken up when the screen-brush F moves forward and backward under the screen E², as above described. When the main shaft C is rotated, it imparts a similar rotary motion to the shafts A² and A³, as before described, so that the two sprocket-wheels F⁶ on the said shafts impart a traveling motion to the endless chain F⁵, which, on passing over the sprocket-wheel F⁴, turns the shaft F', and consequently the screen-brush F. The latter thus revolves under the screen E², and at the same time has a forward and backward motion under the same.

The vibrating screen-box E is hung at each end on the arms E⁶, pivoted to the outsides of the heads D'. A transverse swinging motion is imparted to the screen-box E by the vibrator K, consisting of two horizontal arms K', pivotally connected with studs E⁷, secured in the middle of the said screen-box E at each end, and pivotally connected at their opposite ends with crank-arms K², secured on a longitudinally-extending rock-shaft K³, mounted to turn in suitable bearings on the main frame B. On the shaft K³ are secured the downwardly-extending arms K⁴ and K⁵, connected with each other at their lower ends by a rectangular frame $K^6$, in two opposite ends of which screw the bolts $K^7$, supporting the spherical segments $K^8$, inclosing a rubber ball $K^9$. By screwing the bolts $K^7$ inward or outward the rubber ball $K^9$ may be pressed closely together or held loosely between the said spherical segments $K^8$, as desired.

Through the rubber ball $K^9$ passes an arm $K^{10}$, fulcrumed loosely on the shaft $K^3$, and provided on its lower end with a pivot $K^{11}$, on which is fulcrumed the connecting-rod $K^{12}$, connecting with the crank or eccentric $C'$, formed in the main shaft $C$. Thus when the latter is rotated said eccentric $C'$ imparts a forward and backward swinging motion to the rod $K^{12}$, which acts on the loosely-swinging arm $K^{10}$, which, by its rubber ball $K^9$, imparts a sidewise-swinging motion to the spherical segments $K^8$, held in a frame $K^6$. The latter thus receives a like swinging motion, which is imparted to the arms $K^4$ and $K^5$ and to the shaft $K^3$. The latter by the arm $K^2$ imparts a forward and backward motion to the arm $K'$, so as to vibrate the screen-box $E$ forward and backward on its arms $E^6$. It will thus be seen that the movement imparted to the screen-box $E$ can be regulated by adjusting the bolts $K^7$ in the frame $K^6$ so that the rubber ball $K^9$ has more or less play between the spherical segments $K^8$.

The suction-box $D$ is provided with a V-shaped bottom $D^8$, having perforations, as is plainly shown in Figs. 15 and 16. On the upper side of the bottom $D^8$ of the box $D$ are held the longitudinal strips $D^9$, serving to cover up a greater or less number of the perforations in the bottom $D^8$, as desired. Each of the strips $D^9$ is provided for this purpose, at each end, with a slot $D^{10}$, through which passes a bolt $D^{11}$ for securing the respective strip $D^9$ to the bottom $D^8$ when the said strip is adjusted to its proper place. The strips $D^9$ are preferably tapering, as shown in Fig. 15, so that more of the perforations at one end of the box $D$ are uncovered than at the other end of the box $D$.

Below the bottom of the box $D$ is held a V-shaped trough $L$, provided at one side in its bottom with a self-opening gate $L'$, which permits the accumulated coarse middlings to pass down into the screen-box, as is plainly shown in Fig. 6. In this trough $L$ is held a pipe $L^2$, which passes through the heads $D'$ to the outer air, and is also provided at the bottom with perforations, so that when the suction-fan $D^7$ is set in motion air is drawn into the interior of the drum $A$ into the suction-box $D$ through the said pipe $L^2$. The V-shaped trough $L^2$ is inclosed by the longitudinal walls $L^3$, secured to the heads $D'$, and extending at their lower edges to the top of the screen-box $E$. To the heads $D'$ is also secured the longitudinally-extending inclined wall $L^4$, against which, about midway on its under side, abuts the upper end of the wall $L^3$. Near one head $D'$ a compartment $L^6$ is formed under the lower end of the wall $L^4$ and in front of the wall $L^3$. This compartment is closed at its inner end by a transverse partition $L^7$, as is plainly shown in Fig. 5. The lower end of this compartment $L^6$ opens onto an inclined bottom $L^8$, discharging onto the flange $E^4$ of one of the sides of screen-box $E$. Into this compartment $L^6$ opens the inlet-spout $L^9$, through which pass the middlings to the machine.

In the compartment $L^6$ is held the middlings feed-wheel $N$. (Shown in detail in Figs. 17 and 18.) The feed-wheel is preferably made in the shape of an octagonal cylinder having the sides $N'$, on each of which is secured a plate $N^2$, provided with outwardly-extending lugs $N^3$, slightly inclined, as shown in Fig. 18. Each of the plates $N^2$ is fulcrumed at $N^4$ near one end of the respective side $N'$, and the other end of the said plate $N^2$ is provided with a bolt $N^5$, passing through a slot $N^6$ in the respective side of the octagonal cylinder of the feed-wheel. The plate $N^5$ and the slot $N^6$ serve to place the plate $N^2$ in an angular position, as shown in Fig. 17, and I preferably arrange the plates $N^2$ in such a manner that the succeeding plates are placed in opposite directions on the respective sides $N'$ of the octagonal cylinder. This feed-wheel $N$ is secured on a shaft $N^7$, mounted to rotate in suitable bearings in the head $D'$, and carrying at its outer end a pulley $N^8$, connected by a crossed belt $N^9$ with a pulley $N^{10}$, fastened on the shaft $A^2$, so that when the latter is rotated a like motion is imparted to the shaft $N^7$ and to the said feed-wheel $N$. The latter serves for discharging an equal regular quantity of middlings into the screen-box $E$ through the spout $L^8$.

On one side of the screen-box $E$ is secured the upwardly-extending plate $O'$, reaching with its upper end near the lower end of the wall $L^4$, and supporting at its upper end a vibrating pan $O$, extending with the plate $O'$ longitudinally through the machine the length of the screen-box $E$. The inner end of the vibrating pan $O$ opens onto a channel $O^2$, formed on the back of the plate $O'$ by the plate $O^4$, running parallel to the plate $O'$. Between the plates $O'$ and $O^4$ are secured inclined strips $O^3$, which discharge or open at their lower ends onto the screen-box $E$. The plate $O'$ and the pan $O$ are bound by iron bands $O^5$, as shown in Fig. 5, and part of the plate $O^4$ is in front of the feed-wheel $N$ and the incline $L^8$. The vibrating motion of the screen-box $E$ causes a like motion of the said vibrating pan $O$ and the plates $O'$ and $O^4$, secured to the screen-box. The pan $O$ has an inwardly-inclined bottom and receives the middlings from the elevator-strips $A^4$ when the drum $A$ is rotated. The middlings are discharged from the inclined bottom of the pan $O$ into the channel $O^2$, provided with the diagonally-running strips $O^3$, so that the middlings discharged by the pan $O$ in traveling downward pass forward before being discharged into the screen-box E on the flange E⁴. (See Figs. 5 and 6.) The offal discharged through the opening E⁵ of the screen-box E passes onto an inclined strip P, extending from one head-section D² to the other, and provided in its middle with a longitudinal opening P', covered on top by a slide or pusher Q, operated by strings Q', extending through the head-sections D² to the outside. Thus when the slide is closed the offal passes over the lower end of the strip P and again falls onto the elevator-strips A⁴ of the drum A. (See Fig. 19.)

Under the transverse strip P is placed a similarly-running board P², onto which falls the offal passing through the opening P'. The board P² discharges into a conveyer R, of any approved construction, held longitudinally in the head-sections D² and provided with a shaft R', extending to the outside and carrying at one end a pulley R², over which passes a belt R³, also passing over a pulley R⁴, secured on a shaft A³. When the latter is rotated, as before described, said conveyer R is set in motion, and the offal, passing into the conveyer when the slide Q is open, is moved to one end and discharged into the spout R⁵, extending downward on the outside of the front end of the machine, as is plainly shown in Figs. 1 and 5.

Above the inclined strip P is placed a second strip S, also extending longitudinally from one head-section D² to the other, as shown in Figs. 5 and 6. On top of this strip S are pivoted at T' a number of laths T, pivotally connected at their lower ends to a longitudinal rod T², extending at one end to the outside of the machine and carrying on its outer end a knob T⁴, by which the said rod T² can be moved inward or outward, so as to change the positions of the laths T. The latter may stand at right angles to the rod T², as shown in Fig. 5; or they may be inclined, as shown in dotted lines in the said figure. When the position of the laths T is changed from a right-angular to an inclined position, then the middlings, passing onto the inclined strip S, are moved rearward, and are consequently returned to be treated over again in the machine.

To the sides of the suction-box D are held the swinging plates U and U', pivoted in the head-sections D' and reaching at their lower ends to within a short distance of the upper ends of the trough L, as shown in Fig. 6. The plates U and U' may be placed in any desired position, so as to decrease or increase the opening between the said plates and the sides of the suction-box D, and also to increase or diminish the opening between the said plates U and U' and the upper ends of the trough L. In order to change the position of each of the plates U and U' I, provide the outer end of one of its pivots with a crank-arm U², carrying a bolt U³, passing through a slot U⁴, formed in the plate U⁵, secured on the outside of one of the head-sections D'. A screw U⁶ screws on the bolt U³, so as to fasten the latter with the arm U² to the plate U⁵. (See Fig. 1.) In the front head-section D' are formed the windows V, which permit a view of the working of the machine. A door W is also secured in the said head-section D', serving for inspection of the interior of the suction-box D whenever necessary.

The operation is as follows: When the main driving-shaft C is set in motion, the drum A is rotated in the direction of the arrow $a'$, and the fan D⁷ is also set in motion and creates a suction in the suction-box D, and consequently in the interior of the drum A, principally in the trough L, as the latter is directly below the perforated bottom of the suction-box D. The rotary motion of the shaft C also imparts a vibrating motion to the box-screen E and to the vibrating pan O. At the same time the brush F is revolved and moved forward and backward under the screen E² of the screen-box E by the devices H and I, before described. A rotary motion is also imparted to the feed-wheel N, so that when middlings are passed down the inlet-chute L⁹ said feed-wheel N discharges regular quantities of middlings into one end of the box-screen E over the inclined bottom L⁸. The middlings, passing on the screen E², are agitated by the revolving and sliding brush F, so that part passes through the screen E² down into the interior of the drum A, to be carried up by the elevating-strips A⁴. The latter discharge into the vibrating pan O or on the inclined wall L⁴, both of which discharge into the channel O² and onto the diagonal strips O³, which causes the middlings to pass back onto the box-screen E, but farther forward on account of the inclination of said strips O³. The fuzz, &c., in the middlings agitated on the screen E² are drawn upward by the suction in the box D and pass between the plates U and the upper end of the trough L and into the latter, in which the heavier particles fall against the gate L', while the lighter particles are sucked upward through the perforated bottom D⁸ into the suction-box D. From the latter they pass through the channel D⁶ into the fan to be discharged. The offal, passing out through the opening E⁵ in the box-screen E, passes down the incline P and into the conveyer R, to be discharged to the outside. Part of the middlings can be returned when falling on the inclined strip S, and when the laths T are in an inclined position, as before described.

It will be seen that the elevator-strips always carry the middlings upward again to be treated over and over on the box-screen E until they finally arrive in the end compartment E⁸ of the said box-screen, after which they pass through the spout E⁹ to the outside. It will further be seen that by thus treating the middlings over and over again a very fine grade will finally be discharged through the outlet-spout E⁹.

Having thus fully described my invention, I claim as new and desire to secure by Letters Patent—

1. In a middlings-purifier, the combination, with a revolving drum provided with elevator-strips, of a fixed head-section held in the open ends of the said drum, a suction-box held on the said head-sections in the interior of the drum and provided with a perforated bottom, a trough held below the said suction-box, and a vibrating screen-box held in the said drum below the said trough, substantially as shown and described.

2. In a middlings-purifier, the combination, with a revolving drum provided with elevator-strips, of a fixed head-section held in the open ends of the said drum, a suction-box held on the said head-sections in the interior of the drum and provided with a perforated bottom, a trough held below the said suction-box, a vibrating screen-box held in the said drum below the said trough, and an inclined longitudinal wall held on the said head-sections inside of the said drum and onto which discharge the elevator-strips, the lower edge of the said wall discharging into the screen-box, substantially as shown and described.

3. In a middlings-purifier, the combination, with a revolving drum provided with elevator-strips, of a fixed head-section held in the open ends of the said drum, a suction-box held on the said head-sections in the interior of the drum and provided with a perforated bottom, a trough held below the said suction-box, a vibrating screen-box held in the said drum below the said trough, an inclined longitudinal wall held on the said head-sections inside of the said drum and onto which discharge the elevator-strips, and a channel into which discharges the lower end of the said wall and which opens into the screen-box, and inclined strips held in the said channel to cause a forward and downward motion of the middlings, substantially as shown and described.

4. In a middlings-purifier, the combination, with a revolving drum provided with elevator-strips, of a fixed head-section held in the open ends of the said drum, a suction-box held on the said head-sections in the interior of the drum and provided with a perforated bottom, a trough held below the said suction-box, a vibrating screen-box held in the said drum below the said trough, an inclined longitudinal wall held on the said head-section inside of the said drum and onto which discharge the elevator-strips, a channel into which discharges the lower end of the said wall and which opens into the screen-box to which it is secured, inclined strips held in the said channel to cause a forward motion of the middlings, and a pan secured on the outer wall of the said channel, and also discharging onto the inclined strips, substantially as shown and described.

5. In a middlings-purifier, the combination, with a revolving drum provided with elevator-strips, of fixed head-sections held in the open ends of the said drum, a suction-box held on the said head-sections in the interior of the drum and provided with a perforated bottom, a trough held below the said suction-box, a vibrating screen-box held in the said drum below the said trough, an inclined longitudinal wall held on the said head-sections inside of the said drum and onto which discharge the elevator-strips, a channel secured on the said screen-box and discharging into the same and receiving its supply partly from the said wall, inclined strips held in the said channel to cause a forward motion of the middlings, and a pan secured to the said channel to vibrate with the screen, and also discharging onto the inclined strips, substantially as shown and described.

6. In a middlings-purifier, the combination, with a revolving drum provided with elevator-strips, of a vibrating screen-box held in the interior of the said drum and provided with a bottom screen and an outlet-spout, a trough held above the said screen-box and provided with a door, and a suction-box held above the said trough and provided with a perforated bottom, substantially as shown and described.

7. In a middlings-purifier, the combination, with a revolving drum provided with elevator-strips, of a vibrating screen-box held in the interior of the said drum and provided with a bottom screen and an outlet-spout, a trough held above the said screen-box and provided with a door, a suction-box held above the said trough and provided with a perforated bottom, and a perforated pipe held in the said trough and extending to the outside, substantially as shown and described.

8. In a middlings-purifier, the combination, with the revolving elevator-drum, the fixed heads at the ends thereof and the vibrating screen therein, of the longitudinally-extending suction-box secured to the heads above the screen and having a perforated bottom, the inclined longitudinal wall secured to said heads within the drum and upon which said drum discharges, a channel discharging upon the screen and receiving from the lower edge of said wall, a trough under the said suction-box and discharging upon the screen, a feed-compartment under said inclined wall between said channel and suction-box and having an inclined bottom discharging upon the screen adjacent to the discharge end of said channel, and the feed-wheel within said compartment, substantially as set forth.

9. In a middlings-purifier, the combination, with a revolving drum, of a vibrating screen-box held in the said drum, and a feed-wheel provided with adjustable plates having lugs for feeding a regular quantity of middlings into the said screen-box, substantially as shown and described.

10. The combination, with the revolving elevator and drum having stationary heads and the horizontal reciprocating screen, of the inclined plate P, extending longitudinally under the discharge edge of the screen and having an opening P′ between its edges, a slide to regulate said opening, the board P² under the plate P, a conveyer into which said board P² discharges when the slide is open, and the inclined strip S, extending longitudinally from one head to the other above the plate P and discharging at its lower edge into the drum, substantially as set forth.

11. In a middlings-purifier, the combination, with the screen, of separate and independent frames at the ends of the screen, reciprocating bearings mounted thereon, the brush mounted on said bearings, the vibrating lever $H^4$, pivoted between its ends, the pulleys $H^2$ $H^3$, the cords H′, passing over said pulleys and connecting the ends of the lever $H^4$ with said bearings for sliding them in one direction, and the weighted ropes connected with the bearings for sliding them in the opposite direction, substantially as set forth.

12. In a middlings-purifier, the combination, with the screen, of the frames, the reciprocating bearings mounted thereon, the brush journaled in said bearings and having a sprocket-wheel on one end, an operating sprocket-chain therefor, and counterbalanced self-acting belt-tighteners, substantially as set forth.

13. The combination, with the screen, of the rotary reciprocating brush thereunder having a sprocket-wheel, the sliding bearings for said brush, the centrally-pivoted vibrating lever $H^4$, the pulleys $H^2$ $H^3$, the ropes H′, passing from opposite ends of said lever over said pulleys and secured to said bearings to slide them in one direction, weighted ropes for sliding the bearings in the opposite direction, the operating crank-shaft, the link connecting said lever with said crank-shaft, and the sprocket-chain passing over said sprocket-wheel to rotate the brush while being reciprocated, substantially as set forth.

14. In a middlings-purifier, the combination, with a vibrating screen-box, of a brush secured on a shaft, bearings carrying the said shaft, a vertically-adjustable frame carrying the said bearings, the device H, for imparting a sliding motion to the said bearings on the said frame, the device I, for operating the said device H, a sprocket-wheel held on the said shaft, a traveling sprocket-chain passing over the said sprocket-wheel to rotate the said brush, and self-acting belt-tighteners, substantially as described, and operating on the said sprocket-chain, as set forth.

15. In a middlings-purifier, the combination, with the screen-box E, mounted to swing, of the links K′, connected with the said box E, the arms $K^2$, pivotally connected with the said link, the shaft $K^3$, carrying the said arms, the arms $K^4$ $K^5$, fastened on the said shaft and carrying the frame $K^6$, the adjustable sphere-segments $K^8$, held in the said frame, the rubber ball $K^9$, inclosed in the said segments, and the arm $K^{10}$, held loosely on the said shaft $K^3$ and supporting the said rubber ball $K^9$, substantially as shown and described.

16. In a middlings-purifier, the combination, with the screen-box E, mounted to swing, of the links K′, connected with the said box E, the arms $K^2$, pivotally connected with the said link, the shaft $K^3$, carrying the said arms, the arms $K^4$ $K^5$, fastened on the said shaft and carrying the frame $K^6$, the adjustable sphere-segments $K^8$, held in the said frame, the rubber ball $K^9$, inclosed in the said segments, the arm $K^{10}$, held loosely on the said shaft $K^3$ and supporting the said rubber ball $K^9$, and an eccentric pivotally connected with the said arm $K^{10}$, to impart a swinging motion to the same, substantially as shown and described.

17. In a middlings-purifier, the combination, with the suction-box D, provided with the perforated V-shaped bottom $D^8$, of the strips $D^9$, held on the said perforated bottom and having the slots $D^{10}$, and the bolts $D^{11}$, for securing the said strips to the said bottom, substantially as shown and described.

WILLIAM KLOSTERMANN.

Witnesses:
A. O. MALMGREN,
LOUIS STOLLE.